Jan. 20, 1953  J. B. WETHERINGTON, ET AL  2,626,039
PORTABLE CONVEYER

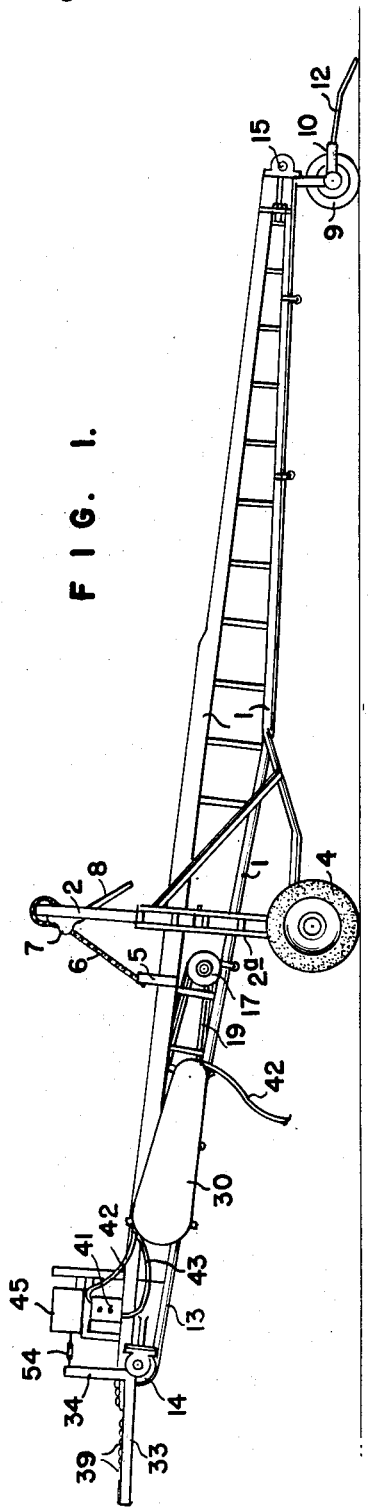

Filed Aug. 28, 1950  5 Sheets-Sheet 2

INVENTORS
J.B. WETHERINGTON &
W. F. RHEM

BY Stone, Boyden & Mack,
ATTORNEYS

Jan. 20, 1953  J. B. WETHERINGTON ET AL  2,626,039
PORTABLE CONVEYER

Filed Aug. 28, 1950  5 Sheets-Sheet 3

INVENTORS
J. B. WETHERINGTON,
W. F. RHEM,
BY Stone, Boyden & Mack,
ATTORNEYS

Jan. 20, 1953    J. B. WETHERINGTON ET AL    2,626,039
POFTABLE CONVEYER
Filed Aug. 28, 1950    5 Sheets-Sheet 4

INVENTORS
J. B. WETHERINGTON &
W. F. RHEM,
BY Stone, Boyden & Mack.
ATTORNEYS

Jan. 20, 1953  J. B. WETHERINGTON ET AL  2,626,039
PORTABLE CONVEYER

Filed Aug. 28, 1950  5 Sheets—Sheet 5

INVENTORS
J. B. WETHERINGTON,
W. F. RHEM,

BY Stone, Boyden Mack.

ATTORNEYS

Patented Jan. 20, 1953

2,626,039

UNITED STATES PATENT OFFICE 2,626,039

PORTABLE CONVEYER

Jesse B. Wetherington and William F. Rhem, Craven County, N. C.

Application August 28, 1950, Serial No. 181,842

3 Claims. (Cl. 198—37)

This invention relates to endless conveyers, and more particularly to conveyers of the wheeled or portable type which can be readily moved from place to place, as required.

One object of the invention is to provide a conveyer of this type, supported on a pair of wheels near its middle, and substantially balanced about such wheels so that it may be readily and easily manipulated.

A further object is to provide a conveyer of this character in which any unbalanced weight is supported by a caster wheel or wheels at one extreme end, with which wheel or wheels is associated a guiding handle, by which the machine may be moved around.

Another object of the invention is to devise a conveyer having a material-receiving support at one end and equipped with improved means for automatically stopping the operation of the conveyer should an excessive weight of material accumulate on this material-receiving support.

While capable of many uses, the invention is especially applicable to the handling of blocks or bricks, particularly to the removal of bricks from a kiln and the loading of them on to a truck or car.

In order that the invention may be readily understood, reference is had to the accompanying drawings, forming part of this specification, and in which:

Fig. 1 is a side elevation of the complete machine.

Fig. 2 is a plan view thereof.

Figure 3:
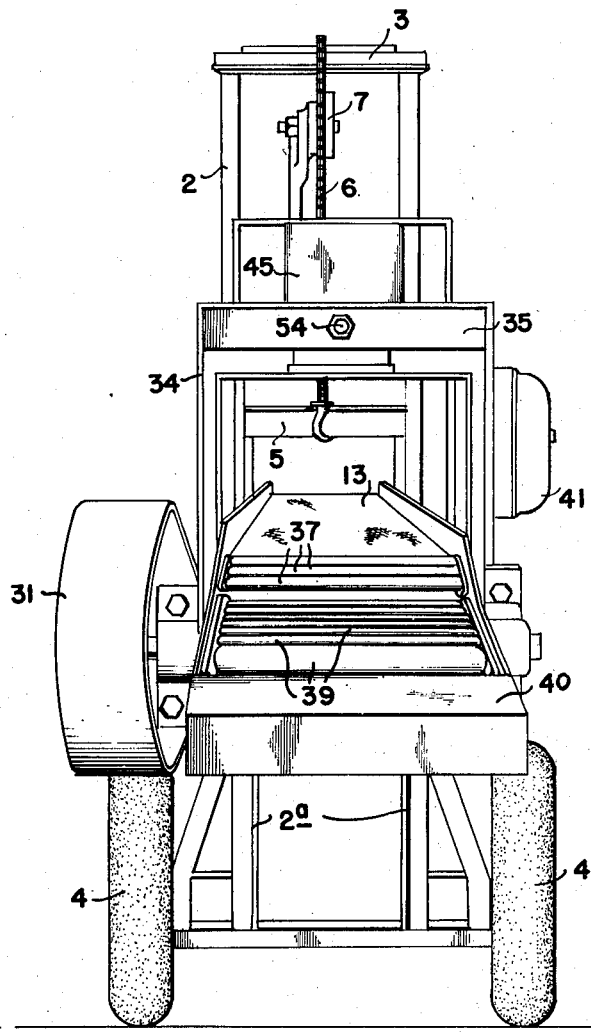
Fig. 3 is an end elevation, on an enlarged scale, of the delivery end of the machine.

Referring to the drawings in detail, the improved machine comprises an elongated frame 1, preferably of trussed construction. Near the middle of this frame are a pair of generally vertical standards, each comprising an upper section 2 slidably mounted in a lower section 2ª. The top of the upper sections 2 are connected by a cross bar 3, and the lower sections 2ª are supported on a pair of main wheels 4. Adjacent the above described standards is a bracket 5 secured to the main frame, to which bracket is attached one end of a sprocket chain 6. This chain extends upwardly through a ratchet hoist 7 of well-known construction, operated by an oscillating handle or lever 8, the hoist being suspended from the cross bar 3 at the top of the standards. By operating the lever 8, the chain 6 is drawn through the hoist, thus lifting the main frame of the machine relative to the standards. In this way the height of the machine may be adjusted as desired.

Although the wheels 4 are located near the middle of the machine, it will be observed that one end, namely the right hand end, is longer than the other, or left hand end. At the extreme end of the right hand, or longer portion of the machine, is located a pair of caster wheels 9 mounted in a frame 10 swiveled to the main frame of the machine at 11, the swiveled frame being provided with a guiding handle 12 by means of which the wheels 9 may be manipulated. A motor and driving pulleys, as hereinafter described, are mounted on the left hand or shorter portion of the frame and tend to balance the weight of the longer portion. Any unbalanced weight, however, due to the right hand end of the machine being longer than the left hand end, is supported by the caster wheels 9. The handle 12 constitutes means by which the machine may be pulled or moved around from place to place.

An endless conveyer belt 13 extends around the main frame of the machine from one end to the other, this belt passing around a drum 14 at the left hand end, and around a drum at the right hand end, mounted on a shaft 15 and journalled in suitable bearings. Adjusting screws 16 are preferably provided for shifting these bearings so as to adjust the tension on the belt, in a well known manner.

The endless conveyer belt is driven by means of an electric motor 17 mounted on the main frame near the wheels 4. This motor carries a pulley 18 around which a belt 19 passes over a pulley 20 mounted on a shaft 21, on the opposite end of which is secured a pulley 22 connected by a belt 23, with another pulley 24 mounted on a shaft 25, on the opposite end of which is secured a pulley 26 which, through a belt 27, drives a pulley 28 on the shaft of the drum 14. Thus, these series of pulleys, each pair of which comprises a smaller and larger pulley, serve as speed reduction gearing between the motor and the drum 14. In order to protect the various pulleys and belts, they are preferably enclosed in housings 29, 30 and 31 as clearly shown in Figs. 1 and 2.

Figure 4:
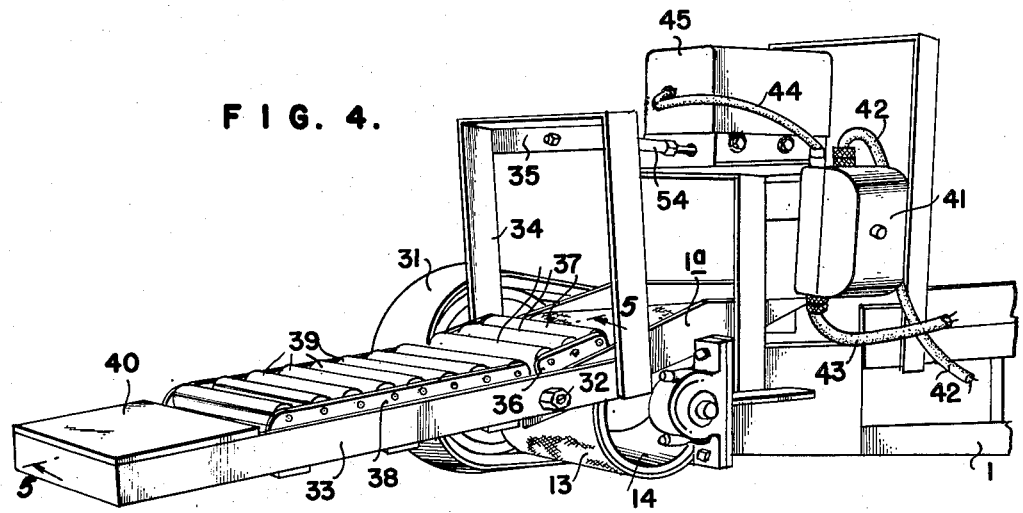
Fig. 4 is a perspective view on an enlarged scale of the automatic switch-controlling device at the delivery end of the machine.
Figure 5:
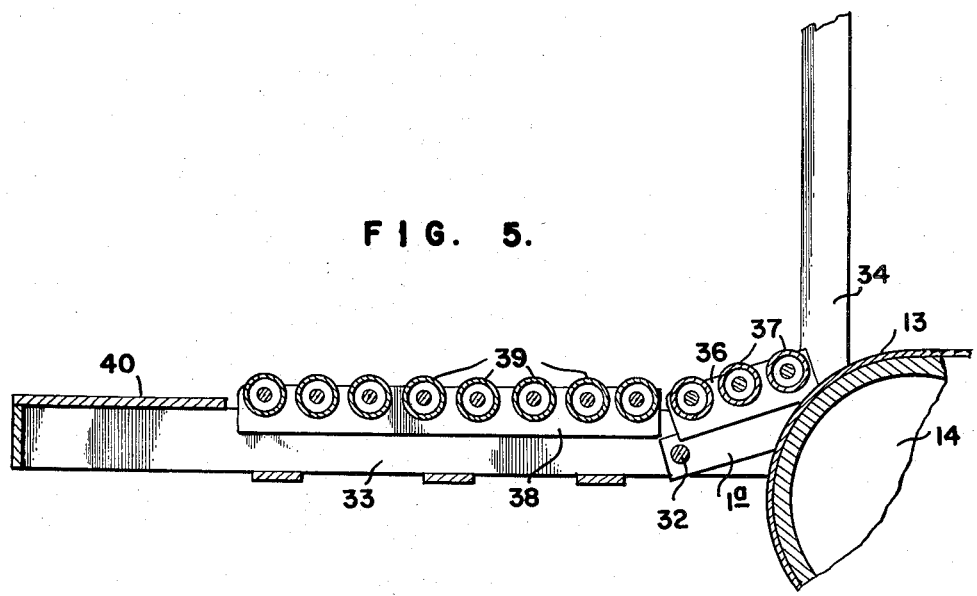
Fig. 5 is a vertical section substantially on the line 5—5 of Fig. 4.

The upper side members of the main frame 1 are extended slightly beyond the drum 14 and preferably incline downwardly as shown at 1e in Figs. 4 and 5. Pivoted on a rod 32, carried by the ends of the members 1a, is a frame 33 having at its end adjacent the drum 14 a pair of upstanding arms 34 extending substantially at right angles to the frame 33 and connected at their upper ends by a cross bar 35.

A group of stationary rollers 37, shown as 3 in number, are journalled in a pair of supporting members 36 secured to the extensions 1a of the main frame, so that this group of rollers lies closely adjacent the upper run of the belt 13 and are disposed in an inclined position.

Mounted in supporting members 38, carried by the frame 33, closely adjacent the rollers 37, are a series of horizontal rollers 39, the normal position of the frame 33 being such that the rollers 39 provide a substantially level surface.

Carried by the frame 33, adjacent its outer end at a point beyond the rollers 39, is a fixed platform 40.

From the foregoing, it will be understood that the frame 33 and its arms 34 constitute a pivotally mounted support positioned to receive the material delivered from the conveyer belt 13.

Mounted on the main frame of the machine adjacent this support is a manual switch 41, shown as of the push-button type, and normally controlling the supply of current to the motor driving the belt. Current is supplied by a cable 42 extending from the switch 41 to a suitable source of supply, which cable may be conveniently wound around and upon the housing 30 when not in use. A second cable 43 extends from the switch 41 to the motor.

Figure 6:
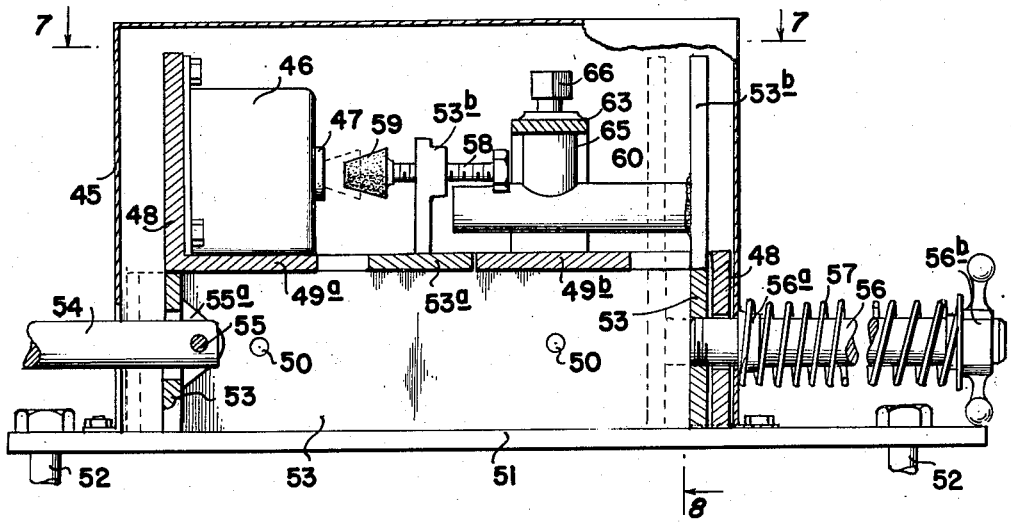
Fig. 6 is a central vertical section through our improved switch operating mechanism, parts being shown in elevation.

A third cable 44 extends from the switch 41 into a special switch box 45, where it is connected to an automatic switch 46 (see Figs. 6 and 7) having a push-button 47.

It will be understood that the motor circuit from the switch 41 is such that it is led through the automatic switch 46 by means of the cable 44, so that it is necessary for both switches 41 and 46 to be closed in order to supply current to the motor. The switch 46 is normally closed, so that the motor may be controlled manually as desired by means of the switch 41. However, upon operation of the push-button 47, the switch 46 is opened, and, if the motor is running at the time, the motor will be stopped.

We provide special mechanism for automatically actuating the push-button 47 of the switch 46 under certain predetermined conditions, which will now be described.

Figure 7:
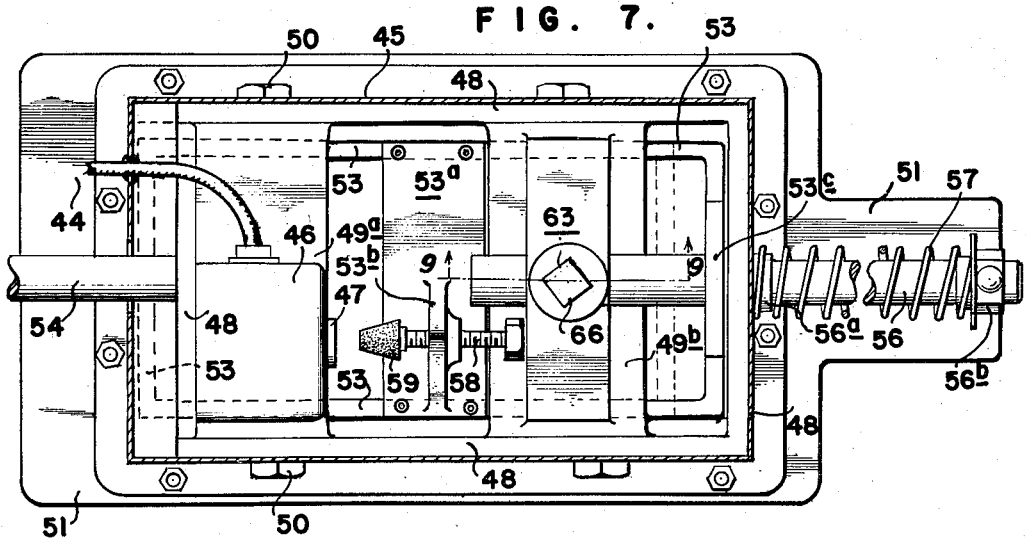
Fig. 7 is a horizontal section substantially on the line 7—7 of Fig. 6.
Figure 11:
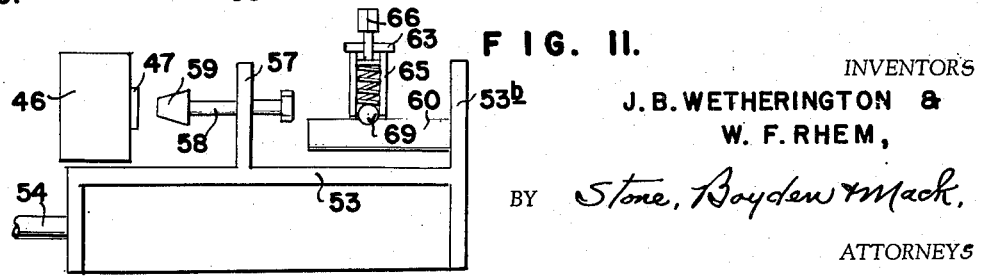
Fig. 11 is a schematic view on a smaller scale illustrating the operating principles of the switch mechanism.
Figure 8:
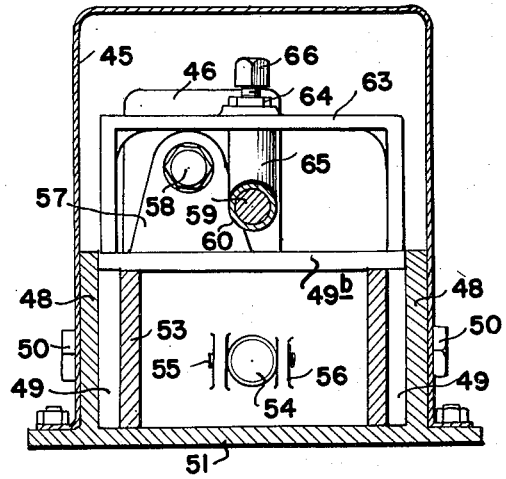
Fig. 8 is a transverse vertical section substantially on the line 8—8 of Fig. 6.

In the switch box 45 is a fixed frame 48 of rectangular shape as best shown in Fig. 7, and within this fixed rectangular frame are two sets of spacing members 49, secured to the frame 48 by bolts 50.

Bridging one set of such spacing members is a horizontal plate 49a, and bridging the other set is a horizontal plate 49b. The fixed frame just described is integral with or welded to a base 51 secured to the main frame of the machine as by bolts 52.

Slidably mounted between the pairs of spacing members 49, and beneath the bridging members 49a and 49b, is a movable rectangular frame 53 which rests and slides upon the base 51, after the manner of a drawer. Secured to one end wall of the movable member 53 is a pull rod 54, this being preferably connected by means of a pivot pin 55 extending through spaced ears 55a on the inside of the movable frame. This pull rod is connected at its other end to the cross bar 35, carried by the upstanding arms 34 of the material receiving support.

Secured to the end wall of the movable frame 53, opposite that to which the pull rod 54 is attached, is a rod 56. This passes freely through an opening in the end of the fixed frame 48 and through an opening in the housing 45 and through a collar 56a secured to such housing. A helical spring 57 surrounds the rod 56 and is confined between the collar 56a and a nut 56b threaded on to the outer end of the rod. By means of this nut the tension on the spring may be adjusted.

Extending across the upper edges of the side members of the movable drawer-like frame 53 is a plate 53a, and projecting upwardly from this plate is a standard 53b. Through this standard is threaded a screw shaft 58 carrying at its forward end a bumper 59. It will thus be seen that when a pull is exerted on the rod 54, the slidable frame 53 is shifted to the left, as viewed in Fig. 6, against the tension of spring 57, into the position shown in dotted lines, carrying the adjustable bumper 59 with it and causing such bumper to engage and operate the push-button 47 of the switch 46.

Figure 9:
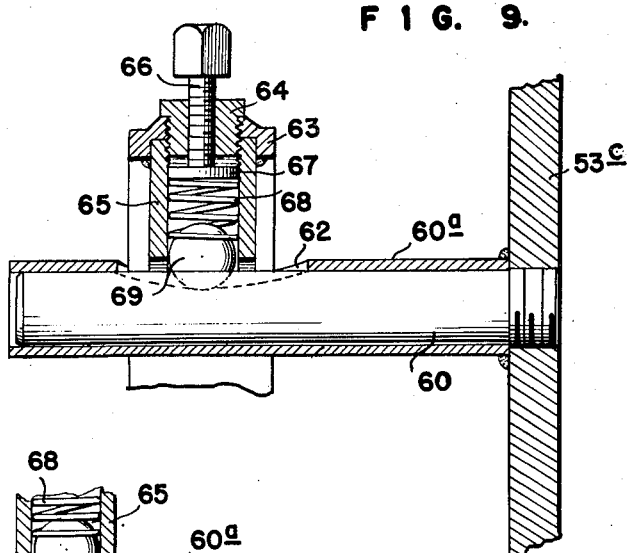
Fig. 9 is a fragmentary vertical section on a further enlarged scale substantially on the line 9—9 of Fig. 7.
Figure 10:
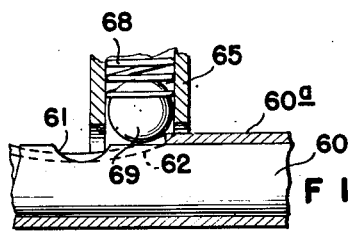
Fig. 10 is a similar fragmentary view showing the parts in a different position.

In order to render the operation of this switch definite and positive, we provide a spring detent device for causing the plunger or bumper 59 to move with a snap action. This device comprises a rod 60 secured to and projecting horizontally from an upstanding portion 53c of the movable frame 53. Surrounding this rod is a tubular sleeve 60a secured as by welding to the member 53c. In the rod 60, at a suitable point in its length, is formed a spherical seat or recess 61, and the tube 60a is cut away on either side of this seat, as indicated at 62 in Figs. 9 and 10.

A yoke or bracket 63 projects upwardly from the fixed member 49b and extends over the said rod 60. This yoke 63 has a threaded opening in which fits a plug 64, the lower end of which is threaded into the upper end of a tubular member 65. A bolt 66 is threaded in and passes downwardly through the plug 64 and carries at its lower end a disc or head 67, which bears against the upper end of a helical spring 68 confined within the tubular member 65. Also, fitting within the lower end of this tubular member, beneath the spring 68, is a ball 69 which is urged downwardly by the spring against the rod 60 and sleeve 60a.

It will thus be seen that as this rod and sleeve move longitudinally beneath the yoke 63, the ball 69 will be caused, by the spring 68, to snap into and out of the seat 61. The cutaway portion 62, which surrounds the seat 61, is for the purpose of maintaining the ball in position when it is forced up out of the seat.

From the foregoing it will now be understood that materials to be conveyed, such for example as bricks, are loaded onto the end of the machine adjacent the caster wheels 9 and are carried by the conveyer belt toward the other end of the machine. As the bricks leave the belt 13, they travel down the inclined roller way 37 onto the horizontal rollers 39, successive bricks pushing those in front of them along. When the bricks reach the left hand end of the series of rollers 39, as viewed in Figs. 4 and 5, they are deposited upon the platform 40, from which they are normally removed by hand. If, however, for any reason, the bricks should not be removed as they reach this platform, they will back up and accumulate on the rollers 39. This accumulated weight will tend to move the supporting frame 33 downwardly and the arms 34 and cross bar 35 will exert a pull upon the rod 54 connected with the automatic switch mechanism. This pull on the rod is resisted both by the tension of the spring 57 and by the ball 69, resiliently held in the seat 61 by means of the spring 68. The first few bricks which remain on the platform 40 will not be heavy enough to overcome the resistance of these two springs, but when a predetermined number of bricks has accumulated on the delivery support, their weight will be sufficient to cause the ball 69 to jump out of the seat or recess 61, and the plunger or bumper 59 will then suddenly move forward and positively operate the push-button 47 of the switch 46, thus interrupting the motor circuit and stopping the conveyer. As soon as the bricks are removed, then spring 57 will serve to restore the parts to their normal condition, in which the ball is again seated in the recess 61 and the switch 46 is closed.

It will thus be seen that we have provided simple and efficient means for positively operating the automatic switch with a snap action, to stop the motor upon the accumulation of a predetermined number of bricks on the receiving support, and it is thought that the numerous advantages of the invention will be readily appreciated by those familiar with such matters.

What we claim is:

1. The combination with an endless conveyor, of a motor for driving the same, a substantially horizontal support pivotally mounted near one end at a point adjacent the delivery end of said conveyer and positioned to receive material therefrom, a casing, a normally closed switch of the push-button type within said casing for controlling the supply of current to said motor, a member slidably mounted within said casing, means connecting said support to said member to move the same, means carried by said slidable member for engaging and actuating the button of said switch to open the same, and a spring detent serving to restrain the movement of said slidable member until the moving force applied thereto exceeds a predetermined amount and then release the same, whereby the button of said switch is operated with a snap action.

2. The combination with an endless conveyer,
of a motor for driving the same, a substantially horizontal support pivotally mounted near one end at a point adjacent the delivery end of said conveyer and positioned to receive material therefrom, spring means for sustaining said support, a normally closed switch for controlling the supply of current to said motor, a slidable member for engaging and opening said switch, when moved to a predetermined extent, means whereby the weight of material on said support, operating against the tension of said spring means exerts a force on said slidable member, tending to move the same, a spring detent serving to restrain the movement of said slidable member until the moving force exceeds a predetermined amount and then release the same, so that said switch is opened with a snap action, and means whereby said spring means serves to restore said switch and spring detent to normal position when the accumulated material is removed from said support.

3. The combination with an endless conveyer, of a motor for driving the same, a normally closed switch for controlling the supply of current to said motor, a substantially horizontal support pivoted near one end at a point adjacent the delivery end of said conveyer, and adapted to receive material therefrom, spring means for sustaining said support, said support having a material-receiving surface made up of a series of parallel rollers adjacent said conveyer and a fixed platform at the extreme end remote from said conveyer and beyond said rollers, on which platform the material passing over said roller accumulates, means whereby excessive weight of accumulated material one said platform serves to rock the support on its pivot against the tension of said spring means, and means whereby the rocking movement of said support serves to open said switch.

JESSE B. WETHERINGTON.
WILLIAM F. RHEM.

REFERENCES CITED

The following references are of record in the file of this patent:

UNITED STATES PATENTS

| Number | Name | Date |
| --- | --- | --- |
| 559,216 | Richards | Apr. 28, 1896 |
| 698,379 | Elizondo | Apr. 22, 1902 |
| 1,589,091 | Barber | June 15, 1926 |
| 1,892,790 | Smelser | Jan. 3, 1933 |
| 1,987,272 | Sprecker | Jan. 8, 1935 |
| 2,212,508 | Brunnhoelzl | Aug. 27, 1940 |
| 2,270,083 | Rapp | Jan. 13, 1942 |
| 2,271,754 | Zale | Feb. 3, 1942 |
| 2,385,233 | Robinson | Sept. 18, 1945 |

FOREIGN PATENTS

| Number | Country | Date |
| --- | --- | --- |
| 463,280 | Great Britain | Mar. 25, 1937 |